(12) United States Patent
Price (10) Patent No.: US 9,195,603 B2
(45) Date of Patent: Nov. 24, 2015

(54) STORAGE CACHING

(75) Inventor: Jeffrey A. Price, Pleasanton, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 284 days.

(21) Appl. No.: 13/642,045

(22) PCT Filed: Jun. 8, 2011

(86) PCT No.: PCT/US2011/039594
§ 371 (c)(1),
(2), (4) Date: Oct. 18, 2012

(87) PCT Pub. No.: WO2011/156466
PCT Pub. Date: Dec. 15, 2011

(65) Prior Publication Data
US 2013/0042066 A1  Feb. 14, 2013

Related U.S. Application Data (60) Provisional application No. 61/352,747, filed on Jun. 8, 2010.

(51) Int. Cl.
*G06F 12/08* (2006.01)
(52) U.S. Cl.
CPC ...... *G06F 12/0866* (2013.01); *G06F 2212/311* (2013.01)
(58) Field of Classification Search
CPC .......... G06F 12/0866; G06F 2212/311; G06F 11/1456; G06F 11/1469; G06F 11/1461; G06F 11/1458; G06F 17/30212
See application file for complete search history.

(56) References Cited

U.S. PATENT DOCUMENTS

| | | | | |
|---|---|---|---|---|
| 5,761,705 | A * | 6/1998 | DeKoning et al. | 711/113 |
| 6,173,374 | B1 | 1/2001 | Heil et al. | |
| 6,463,509 | B1 * | 10/2002 | Teoman et al. | 711/137 |
| 6,658,478 | B1 | 12/2003 | Singhal et al. | |
| 7,024,523 | B1 * | 4/2006 | Young | 711/154 |

(Continued)

FOREIGN PATENT DOCUMENTS

WO  WO2005043395  5/2005

OTHER PUBLICATIONS

R. Karedla, J.S. Love, and B.G. Wherry, "Caching Strategies to Improve Disk Performance," Computer, vol. 27, No. 3, pp. 38-46, Mar. 1994.*

(Continued)

*Primary Examiner* — Cheng-Yuan Tseng
*Assistant Examiner* — Francisco Grullon
(74) *Attorney, Agent, or Firm* — International IP Law Group, PLLC (57) ABSTRACT

The present disclosure provides a method for processing a storage operation in a system with an added level of storage caching. The method includes receiving, in a storage cache, a read request from a host processor that identifies requested data and determining whether the requested data is in a cache memory of the storage cache. If the requested data is in the cache memory of the storage cache, the requested data may be obtained from the storage cache and sent to the host processor. If the requested data is not in the cache memory of the storage cache, the read request may be sent to a host bus adapter operatively coupled to a storage system. The storage cache is transparent to the host processor and the host bus adapter.

11 Claims, 5 Drawing Sheets

(56) References Cited

U.S. PATENT DOCUMENTS

| | | | |
|---|---|---|---|
| 7,275,134 B2 * | 9/2007 | Yang et al. | 711/122 |
| 7,543,100 B2 | 6/2009 | Singhal et al. | |
| 2001/0021949 A1 * | 9/2001 | Blightman et al. | 709/219 |
| 2002/0188697 A1 | 12/2002 | O'Connor | |
| 2005/0108473 A1 * | 5/2005 | Le Moal et al. | 711/113 |
| 2005/0144223 A1 * | 6/2005 | Yang et al. | 709/203 |
| 2009/0248979 A1 * | 10/2009 | Kobayashi et al. | 711/114 |

OTHER PUBLICATIONS

IPRP (International Preliminary Report on Patentability, PCT/US2011/039594, HP reference 82756444, Dec. 20, 2012, 5 pps.

International Search Report and Written Opinion, application No. PCT/US2011/039594, dated Feb. 9, 2012, 8 pages.

* cited by examiner

STORAGE CACHING

This is a 371 national phase application of PCT/US2011/039594 filed 8 Jun. 2011.

This application claims the benefit of U.S. Provisional Application No. 61/352,747, filed on Jun. 8, 2010, which is incorporated herein by reference in its entirety for all purposes.

BACKGROUND

Modern storage devices, such as hard disk drives, generally provide some form of cache memory in addition to the hard disk storage due to the latency difference between hard disk drives and solid state memory. The latency and throughput of hard disk drives are limited by the rotational speed of the platters while the seek time is related to the speed of the hard drive heads movements as well as the rotational speed. Storage arrays (also referred to as storage servers or storage systems), like other computer systems, use caching to enhance storage access performance.

BRIEF DESCRIPTION OF THE DRAWINGS

Certain embodiments are described in the following detailed description and in reference to the drawings, in which.

DETAILED DESCRIPTION

Modern storage devices, such as hard disk drives, generally provide some form of cache memory in addition to the hard disk storage due to the latency difference between hard disk drives and solid state memory. Another approach to storage data caching is to use the host system memory to cache the storage data. If the requested data is present in the host system storage cache, the requested data may be delivered to the application very quickly. However, to implement such a caching technique, a new layer of software for the cache management process would be developed, and some of the processing resources of the host system would be dedicated to processing caching operations. For example, the host system memory would be shared between the applications and the storage cache, and some portion of the compute throughput of the host processors would be consumed by caching operations. Further, the host system memory is generally built around volatile memory such as Dynamic Random Access Memory (DRAM) that loses contents when power is removed and is susceptible to errors. Because implementing a storage cache in the memory of the host system takes away resources used by the applications and is not fault resilient it is not a commonly used approach.

Data caching generally enables data that is used more often to be stored in a faster memory. The cache in a storage system can be implemented with DRAM (Dynamic Random Access Memory) and the caching algorithm is handled by the processors of the storage system controllers. Caching on the storage system is transparent to the host systems. When requesting a block of data, the host system is unaware of the location of the data. Typically, the host system sees the data as volumes or Logical Unit Numbers (LUNs) in a SAN-type storage, or files in a NAS-type storage. In both cases, the requested data is referenced through its relative location inside a volume, LUN, or file. The software running on the storage system maps this relative location into an address in its cache memory or a block address in one or more hard disk drives. The storage system software may also move data from hard disk drives to its own cache memory in anticipation of future accesses from the host system and to discard or write-out data from the cache when it appears that it is no longer used by the host system.

Depending on the applications running on the host systems, caching can provide significant performance enhancements. Caching efficiency is often characterized by a "hit rate," (noted "h" in equation 1 below) which is simply the probability of finding the requested data inside the cache memory instead of its regular repository. Caching is also characterized by its latency. The average latency (noted "L" in equation 1 below) seen from an application can be estimated as:

$$L = h * \text{Cache\_Latency} + (1-h) * \text{Average\_Hard\_Drive\_Latency} \quad \text{eq. (1)}$$

If the hit rate is very high, then the average latency is dominated by the cache latency. However, comparing the latency of DRAM versus hard disk drives is very misleading and overly simplistic as the actual latency seen from the host system is comprised of many layers that comprise what is referred to as the "I/O path." The I/O path is composed of multiple levels of software and firmware running on the host system as well as the multiple hardware links and devices the data must traverse. For example, to retrieve data stored on a storage system, an application running on a host processor may issue a file read request. The file read request may be processed by multiple layers of the system software running on the host system, including the file system, the volume manager, and an Input/Output (I/O) driver. The I/O driver may be invoked to transfer the read request onto the I/O link or the Storage Area Network through an I/O peripheral device such as a Host Bus Adapter (HBA). The issuance of the read request by the host relies on many layers of software which are either part of the operating system or interface intimately with it. The actions described above for the issuance of the read request are typically executed even if the requested data is not in a storage array but instead in a local hard drive internal to the host system.

After the read request is issued over an I/O link or the Storage Area Network through the HBA, the read request may be received by the storage system I/O peripheral device. An I/O driver running on the Storage server may be invoked to handle the read request. The storage system may then determine the location of the requested data. If the requested data is in the cache the I/O driver is invoked to return the data to the host system. If the requested data is not in the cache, another I/O driver is invoked to fetch the data from one or multiple hard drives. The data is then transferred to the storage system cache or another buffer before it can be returned to the host system.

The process of issuing the read request over the I/O link and determining the location of the data contributes to the caching latency. From the perspective of the host system, the latency to access the storage system cache is the sum of: (1) the time to transfer the read request on the I/O link (direct attached storage system) or the storage area network (SAN); (2) the time to locate the data in the cache; and (3) the time to read the data from the cache and transfer it over an I/O link or a storage area network. Even if the storage system cache is built around fast DRAM technology, the access time to the memory itself is only a small part of the overall cache latency as seen by the host. Thus, the ratio between the access time to the storage array cache versus the access time to some of storage array hard drives is not as favorable as typical hardware specifications might infer.

Embodiments described herein provide techniques for reducing latency in storage arrays by providing an added level of storage caching in a computer system between the storage device and the host computer. In embodiments, the added level of storage caching is provided within an I/O (input/output) interface card referred to as a host based adapter (HBA), which is used by (and is part of) the host system to interface with a storage array. The added level of storage caching is transparent to both the host system and the storage system, meaning that software stacks and applications in the host system are unaffected, no compute cycles of the host processor are used, and the storage system is unaware of the presence of this new level of caching. The added level of storage caching provides a universal solution than can be used with any storage system and any host system. The storage cache reduces the latency of data access by disposing the cached data closer to the host compared to traditional storage caching techniques.

Figure 1:
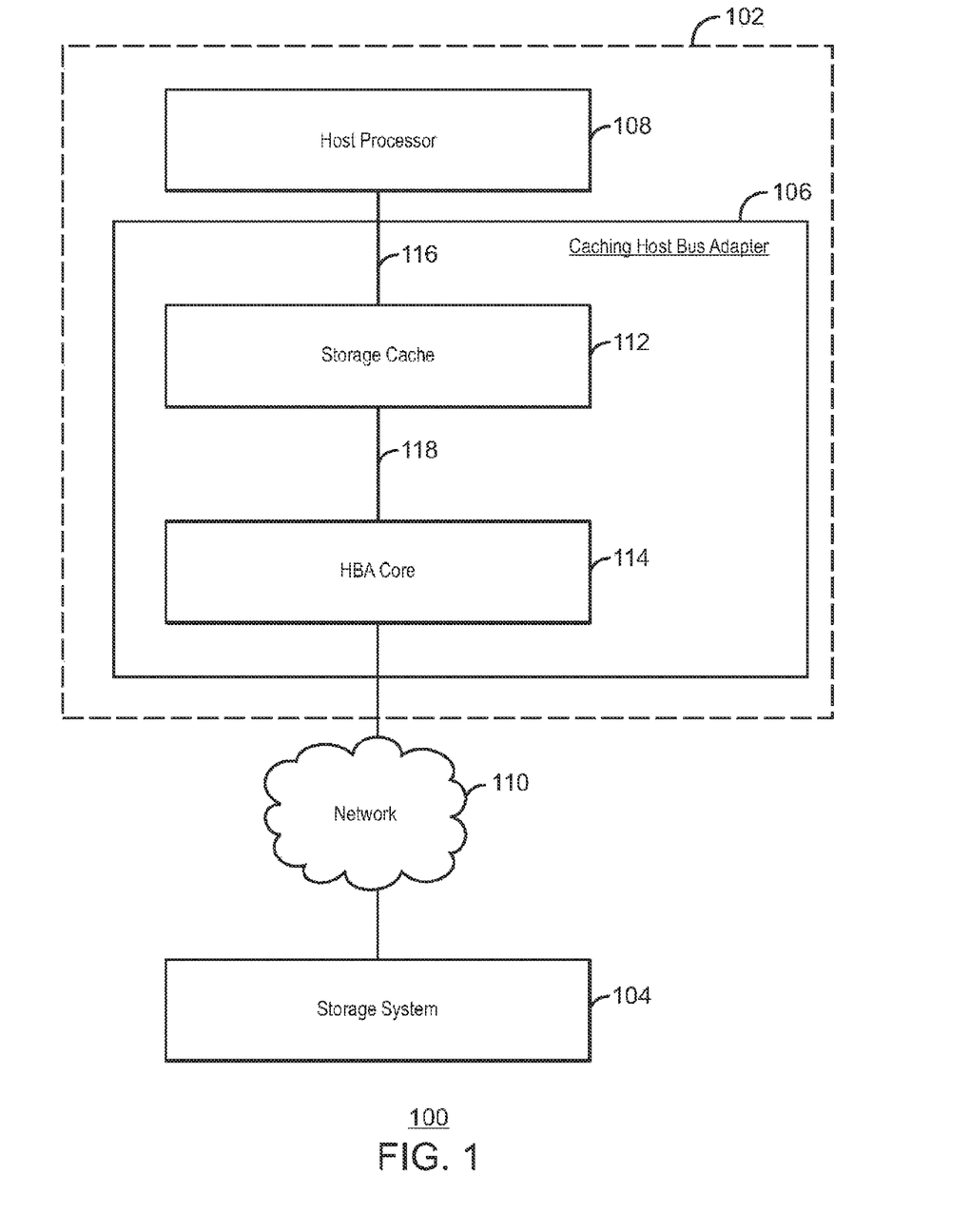
FIG. 1 is a block diagram of a computer system that includes a caching host bus adapter (HBA) with a local storage cache, in accordance with embodiments.

FIG. 1 is a block diagram of a computer system with a caching HBA, in accordance with embodiments. The computer system 100 may include a host computer 102 coupled to a storage system 104 through the caching HBA 106. The host computer 102 may be any suitable computing device, such as a personal computer, a server computer such as an application server, and the like. The host computer 102 includes a host processor 108 that serves as the central processing unit of the host computer 102, and may be any suitable type of processor, including a multi-core processor.

The storage system 104 may include any suitable type of storage devices such as hard disk drives and solid state drives, among others. As shown in FIG. 1, the storage system 104 may be accessed by the host computer 102 through a network 110. For example, the storage system 104 may be a networked storage device such as network attached storage (NAS), or a storage array accessible to the host computer 102 through a Storage Area Network (SAN), a Direct Attached Storage (DAS) system, and the like. It will also be appreciated that the storage system 104 may be a local storage device integrated with the host computer 102 and coupled to the host processor 108 through a direct link.

The caching HBA 106 provides an interface between the host processor 108 and the storage system 104 while also providing an additional level of storage caching, which is integrated into the caching HBA 106. The caching HBA 106 includes a storage cache 112 and a HBA core 114, which may both reside on the same card. The storage cache 112 resides between the host processor 108 and the HBA core 114. The storage cache 112 receives storage operations from the host processor 108 through an industry standard I/O bus 116 of the host computer 102, such as Peripheral Component Interconnect (PCI) bus, PCI-eXtended (PCI-X) bus, or PCI-EXPRESS (PCIe) bus, for example. Upon receiving a storage operation from the host processor 108, the storage cache 112 implements a cache management process and optionally passes the storage operation on to the HBA core 114, depending on the type of storage operation and the result of the cache management process. Storage operations may be sent from the storage cache 112 to the HBA core 114 through another I/O bus 118, such as a PCI, PCI-X, or PCIe bus, for example.

The HBA core 114 implements the logic that is part of a standard HBA. The HBA core 114 may translate storage operations received from the storage cache 112 into the storage protocol used to access the storage system 104, such as the Small Computer System Interface (SCSI) protocol, Internet SCSI (iSCSI), fiber channel, and Fiber Channel Over Ethernet (FOE), among others. The HBA core 114 then sends the translated storage operations to the storage system 104. As explained further in relation to FIG. 2, the storage cache 112 is configured to operate such that the storage cache 112 is transparent to the host processor 108, the HBA core 114, and the storage system 104.

The communications between the host processor 108 and the caching HBA 106 may be performed through a Direct Memory Access (DMA) control block queue. A write from the host processor 108 to the storage array 104 may be accomplished as a DMA read by the caching HBA 106 of the data to be issued from the memory of the host computer 102 which is then forwarded to the storage system 104. A read of the storage array 104 may be accomplished by the caching HBA 106 obtaining the requested data from the storage system 104 and performing a DMA write of the data to the memory of the host computer 102.

In the exemplary embodiment shown in FIG. 1, the storage cache 112 is integrated with the HBA core 114 on the same card to form a local storage cache of the caching HBA 106. In embodiments, the storage cache 112 may be a separate component. For example, the storage cache 112 and the HBA core 114 may occupy separate circuit boards, which are operatively coupled together through a dedicated interconnect of the motherboard of host computer 102. The storage device may also be external to the host computer 102 and coupled to each other through a PCI, PCI-X, or PCIe compatible cable, for example. Embodiments of a computer system 100 with an added level of storage caching may be better understood with reference to FIG. 2 and the accompanying description.

Figure 2:
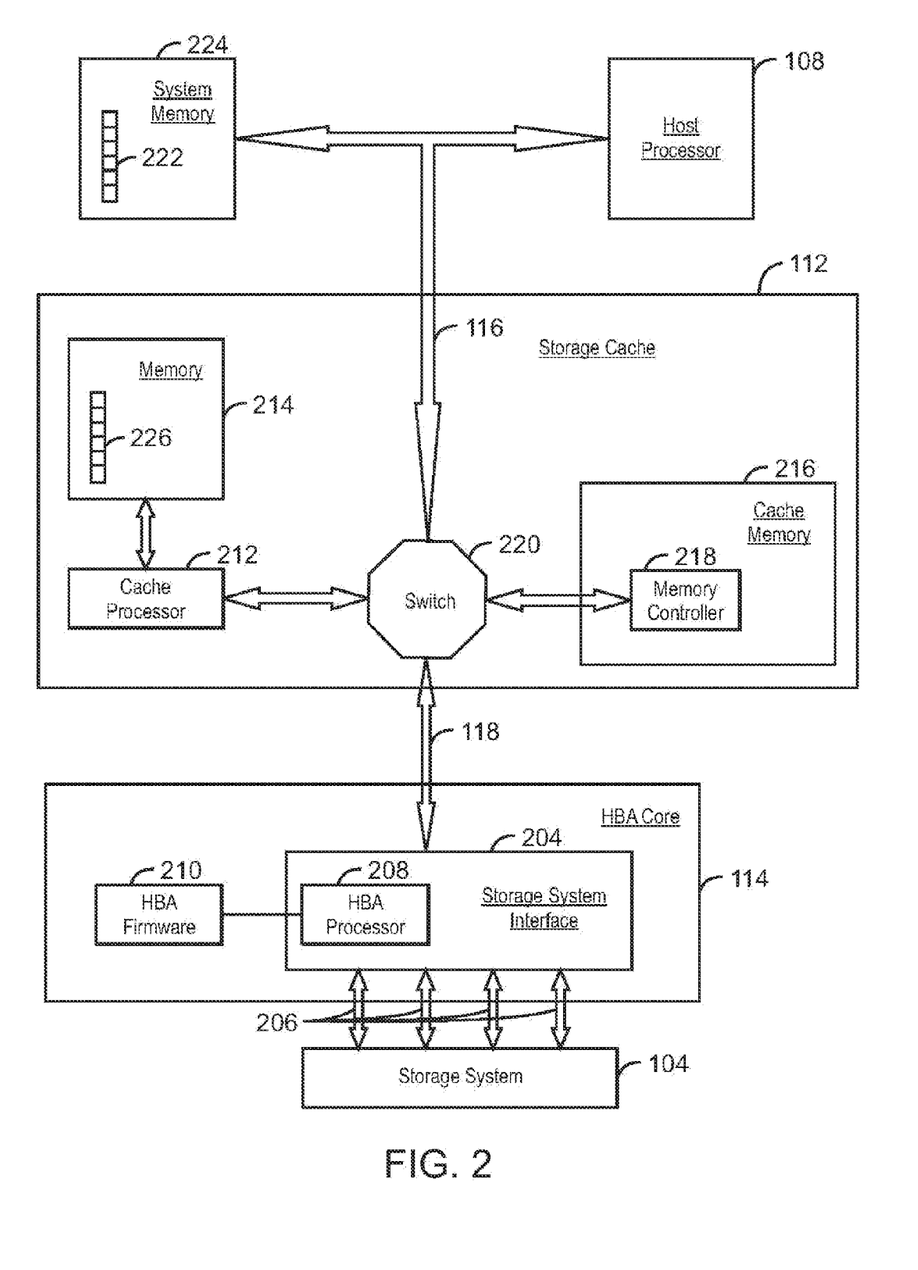
FIG. 2 is a block diagram of a computer system with an added level of storage caching, in accordance with embodiments.

FIG. 2 is a block diagram of a computer system with an added level of storage caching, in accordance with embodiments. The computer system 100 includes a storage cache 112 provides the added level of caching and a HBA core 114 that provides the interface to the storage system 104. As described herein, the added level of storage caching may be implemented as a local storage cache integrated with the caching HBA 106 or in a separate storage cache component coupled between the host computer 102 and a standard host bus adapter.

As shown in FIG. 2, the HBA core 114 includes a storage system interface 204 that interfaces the I/O port 118 from the storage cache 112 to one or more storage system connections 206. The HBA core 114 may include an embedded processor, referred to herein as the HBA processor 208 for processing I/O requests received from the storage cache 112 through the I/O port 118. The HBA core 114 may also include firmware memory, referred to herein as HBA firmware 210, that provides computer-readable instructions for directing the HBA processor 208 to translate the storage operations received from the host processor 108 into the storage protocol used by the storage system 104 and send the storage operations over the storage links 206. Logical block addressing may be used for specifying the location of blocks of data stored on the storage system 104. Storage operations received from the host processor 108 may reference storage memory by logical block address. Logical block addresses may be translated into actual physical memory addresses by the storage system 104 controller or logical block addresses of hard disk drives.

The storage cache 112 includes a processor referred to herein as the cache processor 212. The storage cache 112 also includes a memory 214 for storing computer-readable instructions for directing the cache processor to process storage operations received from the host processor 108. The memory may also be configured to hold temporary data generated during the operation of the storage cache 112. The storage cache 112 may also include a cache memory 216 used to store cached storage data, based on storage operations sent to and received from the host processor 108. The cache memory 216 may include a memory controller 218 configured to receive memory operations from the cache processor 212 and the HBA core 114. For example, the memory controller 218 may be configured to receive PCI, PCI-X, or PCIe based requests from the cache processor 212 and the HBA core 114. In embodiments, the cache memory 216 may include a solid state memory such as flash memory, or volatile memory such as Dynamic Random Access Memory (DRAM), among others memory types. Since flash memory is persistent, the use of flash memory for storing cached data may provide for improved reliability in the event of power loss. Further, flash memory is generally more compact compared to DRAM and thus may provide a larger amount of memory for storing cached data within a given footprint. The storage cache 112 may also include one or more switches 220, such as PCIe switches, used to route data and commands between the I/O bus 116, the cache processor 212, the cache memory 216, and HBA core 114.

The cache processor 212 may be configured to perform storage cache management functions with regard to storage operations received from the host processor 108. Storage operations received from the host processor 108 may include control data, which may include various information such as command information identifying the storage operation as a read or write operation, one or multiple logical block addresses identifying a location of the data corresponding to the read or write, and other information used to initiate and perform communications with the host processor 108. Storage write operations may also include payload data, which is the data to be stored.

Some or all storage writes received from the host processor 108 may be stored to the cache memory 216. The cache processor 212 may be used to map logical block addresses received from the host processor 108 into memory addresses of the cache memory 216. Mapping logical block addresses to memory addresses of the cache memory 216 may be accomplished through on-board index tables, which may be stored in the memory 214, for example. In embodiments, the cache processor 212 may implement a write-through update policy or a write-back update policy. In write-through caching, each time data is written to the cache memory 216, the same data is also be written to the storage system 104. In write-back caching, data may be stored to the cache memory 216 and only written to the storage system 104 when the data is displaced from the cache memory 216. For example, data may be flushed from the cache memory 216 to reclaim the cache memory for other cached data pursuant, for example, to a cache replacement policy implemented by the cache processor 212. The cache replacement policy may determine which data is stored to or removed from the storage memory 216 based on the likelihood or frequency that the cached data will be accessed by the host processor 108. In embodiments, the cache replacement policy may replace cached data according to a First-In-First-Out (FIFO) algorithm. In embodiments, the cache replacement policy replaces cached data by tracking how often cached data is accessed and replacing the Least Recently Used (LRU) cached data first. Other cache replacement policies may also be used in accordance with embodiments.

When a storage read request is received by the cache processor 212 form the host processor 108, the cache processor 212 may determine whether the requested data is stored to the cache memory 216. If the requested data is stored to the cache memory 216, the requested data is retrieved from the cache memory and returned to the host processor 108. If the requested data is not in the cache memory 216, the cache processor passes the storage read request to storage system interface 204 of the HBA core 114. The HBA processor 208 facilitates the retrieval of the requested data from the storage system 104. In embodiments, the cache processor 212 may also implement a read-ahead pre-fetching algorithm. According to the read-ahead pre-fetching algorithm, the cache processor may anticipate future storage read requests and load the corresponding data from the storage system 104 into the cache memory 216 before the storage read request is received from the host processor 108. For example, the host processor 108 may issue consecutive read requests that identify a contiguous block of logical block addresses. The cache processor 212 may be configured to recognize the pattern and retrieve data from one or more of the following logical block addresses in anticipation of receiving a read request from the host processor 108 accessing the data.

As stated above in relation to FIG. 1, the storage cache 112 may be configured to handle storage operations received from the host processor 108 by interacting with a storage driver running on the host processor 108. The storage driver defines control structures and commands in accordance with a layer of a software stack running on the host processor 108 that invokes the driver. The software stack running on the host processor 108 may operate in privileged kernel mode where any software bug can cause problems such as data loss, system crashes, and the like. Once the various pieces of a complex software stack have been tested, end users are reluctant to any change as it requires going through an extensive and expansive qualification process. Interactions between the storage cache 112 and the host processor 108, such as interrupts and DMA requests issued from the storage cache to the host processor 108, may be handled by the storage driver in accordance with its existing programming, as if the host processor 108 were interacting with the HBA core 114 directly. In this way, the storage cache 112 can be configured to be completely transparent to the host processor 108.

The storage links 206 used to access the storage system 104 may include fiber channel, SCSI, iSCSI, and FCoE links, for example. The storage links 206 may use a standard layered software architecture that may reside on the host processor 108. For example, a typical Fiber Channel link includes an upper layer protocol, referred to as a Protocol Mapping Layer (FC-4), upon which the storage communication protocol can be implemented. The storage communication protocol may be an SCSI protocol, such as SCSI-3, and the Protocol Mapping Layer may be referred to as the SCSI Layer. The Fiber Channel I/O link also includes a common services layer (FC-3), which provides services such as encryption and authentication. The Fiber Channel I/O link also includes a Network layer (FC-2) that supports segmentation and reassembly of data frames, flow control, class of service control, and the like. The Fiber Channel I/O link also includes a Data Link layer (FC-1) that provides data encoding and link layer control.

The cache processor 212 may interface with the SCSI layer and the storage device driver running on the host processor 108. The cache processor 212 may also generate interrupts to invoke the storage device driver running on the host processor 108. The interface between the storage cache 112 and the host processor 108 may be implemented though a command queue 222 residing on the main system memory 224 of the host computer 102. The SCSI layer of the storage link software running on the host processor 108 enqueues storage commands, which may be enqueued as command block descriptors (CBDs). The cache processor 212 may fetch storage commands from the command queue 222 and process the storage commands according to the data included in the command block descriptor. If the storage command read from the command queue 222 is a read request, the cache processor 212 may determine whether the requested data is present in cache memory 216. If the requested data is present in cache memory 216, the cache processor 212 may transfer the requested data into the system memory 224 through a Direct Memory Access (DMA) operation via the switch 220. The cache processor 212 may then issue an interrupt to the host processor 108 to indicate completion of the storage operation. If the requested data is not in the cache memory 216, the cache processor 212 may forward the storage command to the HBA core 114.

The storage cache 112 may also include a storage device driver that runs on the cache processor 212 and a command queue 226 stored to in the corresponding memory 214. The storage device driver and command queue 226 operating in the storage cache 112 are in addition to the storage device driver and command queue 222 operated and maintained by the host processor 108. The storage device driver and command queue 226 operating in the storage cache 112 provide an interface to the HBA core 114 that operates, from the perspective of the HBA core 114, in the same manner as the storage device driver and command queue 222 operated and maintained by the host processor 108. In this way, the operations of the storage cache 112 are transparent to the HBA core 114, and the HBA core 114 may perform as desired without any changes to the HBA firmware 210.

When a storage read request is forwarded to the HBA core 114, the storage device driver running on the cache processor 212 may enqueue the command in the command queue 226 residing on the memory 214 of the storage cache 112. The HBA core 114 obtains storage commands from the command queue 226 in the same manner that storage commands would be obtained from the command queue 222 maintained by the host processor 108 if the HBA core 114 were coupled directly to the host processor 108. The HBA core 114 may then obtain the requested data from the storage system 104 and transfer the data into the system memory 224 through the switch 220 via a DMA operation. A copy of the data obtained from the storage system 104 may also be written in the cache memory 216, depending on the cache allocation policy implemented by the cache processor 212. Writing a copy of the storage data to the cache memory 216 may be accomplished by configuring the switch 120 to perform a dual cast operation, wherein data received by the switch 220 from the HBA core 114 is replicated to both the system memory 224 and the cache memory 216. Writing a copy of the storage data to the cache memory 216 may also be accomplished by enqueuing two read requests in the command queue 226 of the storage cache 112. The first read request may be configured to cause the requested data to be written to the system memory 224, and the second read request may be configured to cause the requested data to be written to the cache memory 216.

When the host processor 108 enqueues a write command, the cache processor 212 may receive the write command from the command queue 222 maintained by the host processor 108. To process the write command the cache processor 212 may write the data payload to the cache memory 216. Further, if the storage cache 112 is configured to implement a write-through caching policy, the cache processor 212 may also forward the write command to the HBA core 114 by placing the write command in the command queue 226 of the storage cache 112. The HBA core 114 obtains storage commands from the command queue 226 of the storage cache 112. When the storage system 104 either successfully stores the payload data to permanent storage or has written a second copy for back-up purpose on a different storage controller, the storage system 104 issues an acknowledgment indicating that the write command was processed and the payload data successfully stored to the storage system 104. The HBA core 114 may issue an acknowledgment to the host processor 108 when the HBA core 114 receives the acknowledgement from the storage system 104. Issuing the acknowledgment to the host processor 108 after receiving the acknowledgement from the storage system 104, helps to ensure that no data is lost in case of failure.

In embodiments, the storage cache 112 may be configured to store a backup copy of the cache memory 216 to another storage location, such as another storage cache 112 operatively coupled to the host processor 108 or a separate drive such as a solid state drive, for example. Embodiments of a storage cache 112 configured to store a backup copy of the cache memory 216 are described further in reference to FIG. 3.

Those of ordinary skill in the art will appreciate that the functional blocks and devices shown in FIG. 2 may comprise hardware elements including circuitry, software elements including computer code stored on a non-transitory, machine-readable medium, or a combination of both hardware and software elements. Further, the configuration is not limited to that shown in FIG. 2, as any number of functional blocks and devices may be used in embodiments of the present invention. For example, the processes performed by the cache processor 212 may be implemented as two separate processors, which may have shared access to the memory 214. In such an embodiment, a first processor may be configured to interface with storage driver running on the host processor 108, for example, by providing issuing interrupts and direct-memory access (DMA) requests to the host processor 108. A second processor may be configured to interface with the HBA core 114 by running a storage driver that interfaces with the HBA core 114, for example, by receiving interrupts and DMA requests from the HBA core 114 and maintaining a command queue 226 containing storage operations to be read by the HBA core 114. Those of ordinary skill in the art would readily be able to define specific functional blocks based on design considerations for a particular electronic device.

Figure 3:
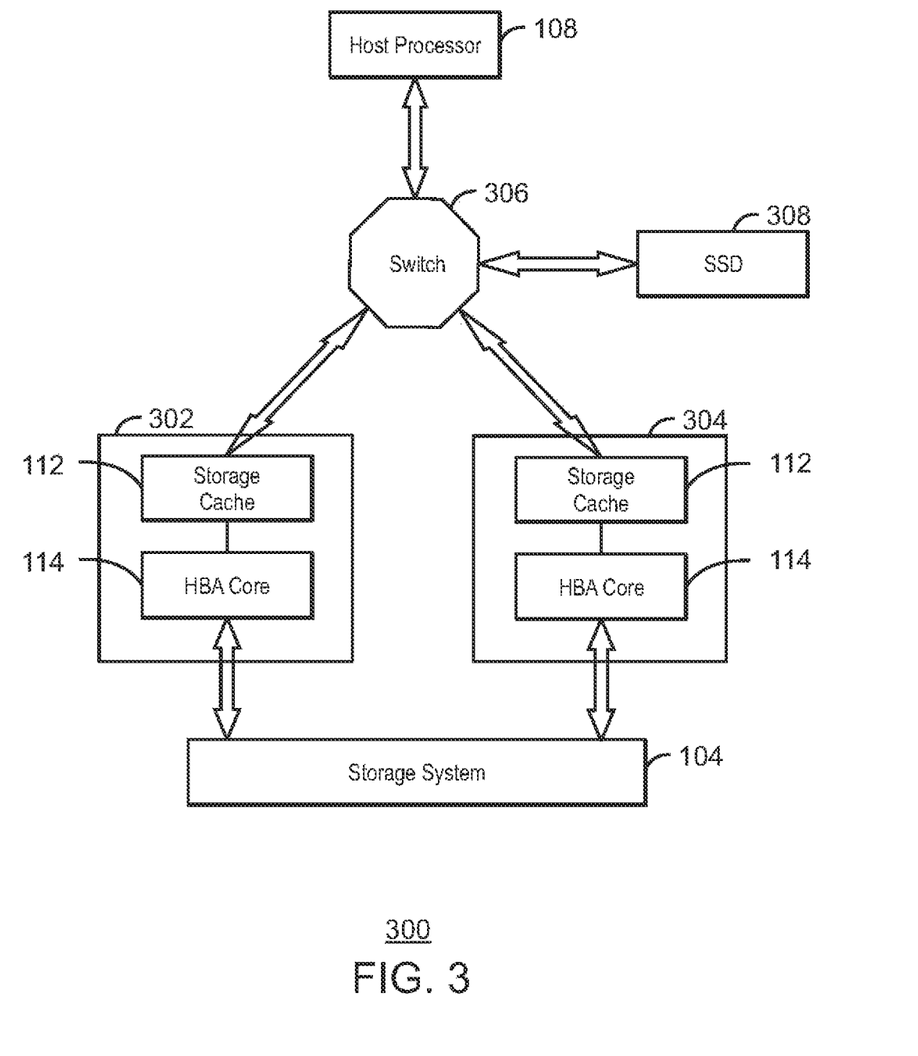
FIG. 3 is a block diagram of a computer system with an added level of storage caching that provides a backup copy of cached storage data, in accordance with embodiments.

FIG. 3 is a block diagram of a computer system 300 with extra instances of caching that provide a backup copy of cached storage data, in accordance with embodiments. The computer system 100 may include a host processor 108 coupled to a storage system 104 through a plurality of caching HBAs, each caching HBA including a local storage cache. For purposes of the present description the caching HBAs are referred to as adapter A 302 and adapter B 304. Although two host bus adapters are shown, it will be appreciated that the system 300 may include any suitable number of host adapters. The host computer 102 may include an I/O network, which may include an I/O switch 306 such as PCIe-based switch. The switch 306 enables the host processor 108 to form peer-to-peer connections between the host bus adapters 302 and 304. In embodiments, the switch 306 also couples the host processor 108 to another storage device such as a solid state drive 308, for example.

In embodiments, each host bus adapter 302 and 304 stores a backup copy of its cache memory to another storage location. For example, the cache memory residing on each of the local storage caches 112 may be used to store duplicate cache data from the other host bus adapters 302 and 304 in the system. Writing new data on adapter A 302 by the processor 108 may be replicated on adapter B 304, and vice-versa. In embodiments, each of the host bus adapters 302 and 304 may store a backup copy of its cache memory to the solid state drive 308. Each time adapter A 302 or adapter B 304 performs a write operation into the storage cache, the write operation may be replicated to a block of memory on the solid state drive 308 reserved for the corresponding host bus adapter 302 or 304. The backup caching operations may be transferred between the local storage caches 202 or from the local storage caches 202 to the solid state drive 308 through an I/O port of the host computer 102 (FIG. 1).

To recover from any failure where local data might be lost, the host bus adapter 302 or 304 is able to recover the cached data by requesting the data from the other local storage cache 202 or from the solid state drive 308. In embodiments, the backup copy of the storage cache may be used to facilitate a failover from one host bus adapter to another. For example, if adapter A 302 were to become inoperable, the host processor 108 could perform a failover routine to transfer control to adapter B 304. Since adapter B 304 would have a backup copy of the cache memory from adapter A 302, adapter B 304 could assume the storage operations of adapter A 302 without any loss of data.

A variety of variations falling within the scope of the present claims may be implemented in accordance with the design considerations of a specific implementation. For example, in embodiments each host bus adapter 302 and 304 may be coupled to a separate storage system 104. In embodiments, the communications between the host bus adapters 302 and 304 or from the host bus adapters 302 and 304 to the solid state drive 308 may be performed over a dedicated I/O link coupling the host bus adapters 302 and 304 to each other and/or to the solid state drive 308 directly. Storing the backup copy of the cache memory may be performed across this dedicated I/O link, which may be coupled to the switch 220 residing within the storage cache 112 (FIG. 2).

Figure 4:
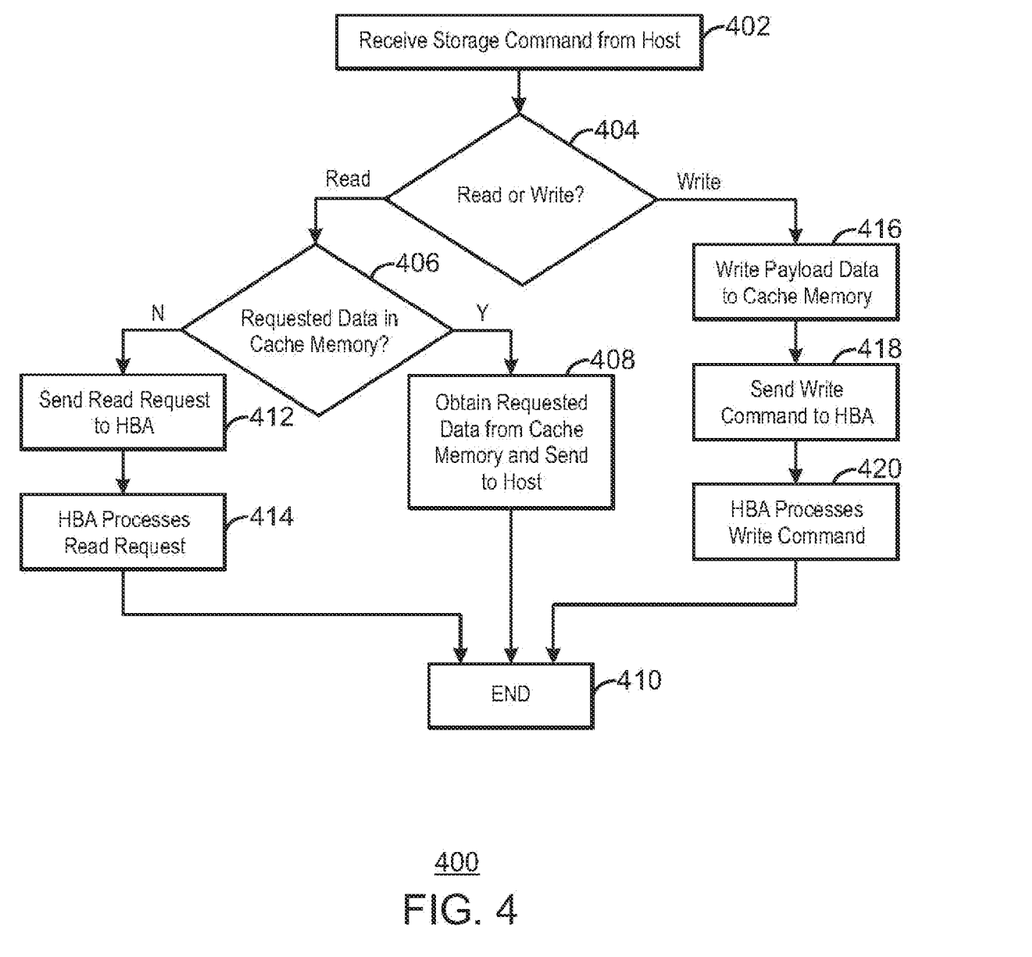
FIG. 4 is a process flow diagram of a method for processing a storage operation, in accordance with embodiments.

FIG. 4 is a process flow diagram of a method 400 for processing a storage operation, in accordance with embodiments. The method 400 may be performed by the storage cache 112 shown in FIGS. 1 and 2. The method 400 may begin at block 402, wherein a storage operation is received from the host processor 108. The storage operation may be obtained by the storage cache from a command queue residing in the host system memory, as described above.

At block 404, a determination is made regarding whether the storage operation is a read request or a write command. If the storage operation is a read request, the process flow may advance to block 406. At block 406, a determination is made regarding whether the requested data referred to in the read request is in the cache memory 216 of the storage cache 112. If the requested data is in the cache memory 216 of the storage cache 112 the process flow may advance to block 408. At block 408, the storage cache 112 obtains the requested data from the cache memory 216 of the storage cache 112 and writes the requested data to the system memory 222, for example, through a DMA write from the storage cache 112 to the system memory 222. The process flow may then advance to block 410 and the process flow terminates. Accordingly, it will be appreciated if the requested data is in the cache memory 216 of the storage cache 112, the storage operation is not forwarded to the HBA core 114 coupled to the storage system 104.

If at block 406, the requested data is not in the cache memory 216 of the storage cache 112, the process flow may advance to block 412. At block 412, the read request is forwarded to the HBA core 114. For example, as described above, the read request may be enqueued in a command queue 226 residing on a memory 214 of the storage cache 112. The HBA core 114 may then obtain the read request from the command queue 226 residing on the storage cache 112. In embodiments, the cache processor 212 enqueues two read requests in the command queue, 226 each read request targeting the same requested data. One read request may be configured to target the memory controller 218 so that the requested data returned by the HBA core 114 may be stored to the cache memory 216 of the storage cache 112. The other read request may be configured to target the system memory 224, so that the requested data returned by the HBA core 114 may be sent to the host system memory 224 through the switch 220.

At block 414, HBA core 114 processes the read request. For example, the HBA core 114 may obtain the requested data from the storage system 104 and return the requested data to either the cache processor or the host processor, depending on configuration of the read request as specified by the cache processor at block 412. For example, the HBA core 114 may issue a DMA write of the requested data to the system memory 224 and/or the memory 214 of the storage cache 112. The process flow may then advance to block 410 and the process flow may terminate.

If at block 404, the storage operation is a write command, the process flow may advance from block 404 to block 416. At block 416, the storage cache 112 may write the payload data contained in the write command to the cache memory 216 of the storage cache 112.

At block 418, the storage cache 112 may forward the write command to the HBA core 114. For example, as described above, the write command may be enqueued in a command queue 226 residing on the memory 214 of the storage cache 112. The HBA core 114 may then obtain the write command from the command queue 226 residing on the storage cache 112. The forwarding of the write command to the HBA core 114 may vary depending of the caching policy implemented by the cache processor. In embodiments, the write command may be enqueued immediately upon storing the payload data to the cache memory 216. In embodiments, the write command may be enqueued at a later time in the event that the portion of cache memory 216 corresponding to the payload data is to be reclaimed in accordance with a cache policy implemented by the cache processor 212. At block 420, the HBA core 114 processes the write command by performing a DMA read of the data to be written from the system memory 224 and sending the data to the storage system 104. The process flow may then advance to block 410, and the process flow terminates.

Figure 5:
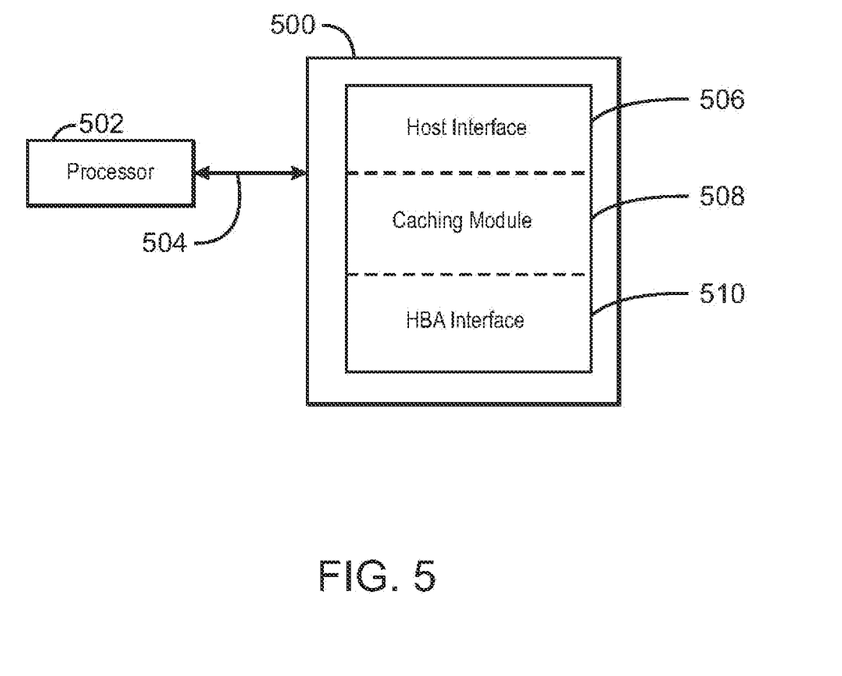
FIG. 5 is a block diagram showing a non-transitory, computer-readable medium that stores code for processing storage operations, in accordance with embodiments.

FIG. 5 is a block diagram showing a non-transitory, computer-readable medium that stores code for processing storage operations, in accordance with embodiments. The non-transitory, computer-readable medium is generally referred to by the reference number 500. The non-transitory, computer-readable medium 500 may correspond to any typical storage device that stores computer-implemented instructions, such as programming code or the like. For example, the non-transitory, computer-readable medium 500 may include one or more of a non-volatile memory, a volatile memory, and/or one or more storage devices. Examples of non-volatile memory include, but are not limited to, electrically erasable programmable read only memory (EEPROM) and read only memory (ROM). Examples of volatile memory include, but are not limited to, static random access memory (SRAM), and dynamic random access memory (DRAM). Examples of storage devices include, but are not limited to, hard disk drives, compact disc drives, digital versatile disc drives, optical drives, and flash memory devices. The non-transitory, computer-readable medium 500 may be firmware used to control an electronic device such as the storage cache 112 of FIG. 3, for example. In some embodiments, the non-transitory, computer-readable medium 500 may also be part of an Application Specific Integrated Circuit (ASIC).

A processor 502 generally retrieves and executes the instructions stored in the non-transitory, computer-readable medium 500 to process storage management operations in accordance with embodiments. In an embodiment, the tangible, machine-readable medium 500 can be accessed by the processor 502 over a computer bus 504. A first region 506 of the non-transitory, computer-readable medium 500 may include a host interface module configured to receive storage operations from the host processor.

A second region 508 of the non-transitory, computer-readable medium 500 may include a caching module configured to process the storage operation received from the host processor. If the storage operation is a write command, the caching module may write the payload data to a cache memory and send the write command to a host bus adapter. If the storage operation is a read request, the caching module may determine whether the requested data is in the cache memory. If the requested data is in the cache memory, the caching module may receive the data from the cache memory and send the requested data to the host processor or the host system memory. If the requested data is not in the cache memory, the caching module may forward the read request to the host bus adapter. In embodiments, the caching module is also configured to store a backup copy of the cache memory to a second storage cache or other storage device operatively coupled to the host processor 108.

A third region 510 of the non-transitory, computer-readable medium 500 may include a host bus adapter interface configured to forward storage operations to the host bus adapter, depending on the outcome of the processing performed by the caching module. For example, the host bus adapter interface may be configured to send storage operations to the host bus adapter by enqueuing the storage operations in a command queue residing on a memory of the storage cache.

Although shown as contiguous blocks, the software components can be stored in any order or configuration. For example, if the non-transitory, computer-readable medium 500 were a hard drive, the software components can be stored in non-contiguous, or even overlapping, sectors.

What is claimed is:

1. A method, comprising:
receiving, in a storage cache, a read request from a storage device driver running on a host processor, wherein the read request identifies requested data;
determining whether the requested data is in a cache memory of the storage cache;
if the requested data is in the cache memory of the storage cache, obtaining the requested data from the storage cache and sending the requested data to the host processor; and
if the requested data is not in the cache memory of the storage cache, sending the read request from a second storage device driver running on the storage cache to a host bus adapter operatively coupled to a storage system by enqueuing the read request in a command queue residing on a memory of the storage cache;
wherein the storage cache is transparent to the host processor and the host bus adapter.

2. The method of claim 1, comprising, in response to sending the read request to the host bus adapter:
receiving the requested data from the storage system through the host bus adapter; and
writing a copy of the requested data received through the host bus adapter to the cache memory of the storage cache.

3. The method of claim 1, comprising:
writing data to the cache memory of the storage cache; and
writing a backup copy of the data to a second cache memory of a second storage cache operatively coupled to the host processor.

4. The method of claim 1, comprising:
receiving, in the storage cache, a write command from the host processor that includes payload data to be stored to the storage system;
writing the payload data to the cache memory of the storage cache; and
passing the write command to the host bus adapter.

5. A system, comprising:
a storage cache operatively coupled to a host processor, the storage cache configured to receive storage operations from the host processor and process the storage operations in accordance with a cache allocation policy implemented by the storage cache; and
a host bus adapter coupled to the storage cache and configured to receive the storage operations from the host processor through the storage cache based on a result of the processing of the storage operations in the storage cache;
wherein a processor of the storage cache interfaces with a storage device driver running on the host processor, and the processor of the storage cache runs a second storage device driver for interfacing with the host bus adapter so that the storage cache is transparent to the host processor and the host bus adapter; and
wherein the storage cache comprises a command queue and the host bus adapter is configured to obtain storage operations from the command queue of the storage cache.

6. The system of claim 5, wherein the storage cache and the host bus adapter are integrated in the same component packaging to form a caching host bus adapter, the storage cache comprises a local storage cache of the caching host bus adapter, and the host bus adapter comprises a host bus adapter core.

7. The system of claim 5, wherein the storage cache is a separate storage caching device operatively coupled between the host processor and the host bus adapter and operatively coupled to the host bus adapter through an I/O bus.

8. The system of claim 5, comprising a second storage cache operatively coupled between the host processor and a second host bus adapter, the storage cache configured to replicate caching operations to the second storage cache.

9. The system of claim 5, comprising a solid state drive operatively coupled to the host processor, the storage cache configured to save a backup copy of a cache memory of the storage cache to the solid state drive.

10. A non-transitory computer readable memory comprising code configured to direct a processor to:
   receive a storage operation from a storage device driver running on a host processor;
   if the storage operation is a write command with payload data, write the payload data to a cache memory and send the write command to a host bus adapter via a second storage device driver running on a storage cache;
   if the storage operation is a read request, determine whether the requested data is in the cache memory; and
   if the requested data is in the cache memory, receive the data from the cache memory and send the requested data to the host processor; and
   if the requested data is not in the cache memory, send the read request to the host bus adapter via the second storage device driver running on the storage cache enqueuing the read request in a command queue residing on a memory of the cache memory.

11. The non-transitory computer readable memory of claim 10, comprising code configured to direct the processor to store a backup copy of the cache memory to a second storage cache operatively coupled to the host processor.

\* \* \* \* \*

UNITED STATES PATENT AND TRADEMARK OFFICE
CERTIFICATE OF CORRECTION

| | | |
|---|---|---|
| PATENT NO. | : 9,195,603 B2 | Page 1 of 1 |
| APPLICATION NO. | : 13/642045 | |
| DATED | : November 24, 2015 | |
| INVENTOR(S) | : Jeffrey A. Price | |

It is certified that error appears in the above-identified patent and that said Letters Patent is hereby corrected as shown below:

In the claims,

In column 13, line 20, in Claim 11, delete "cache" and insert -- cache by --, therefor.

Signed and Sealed this
Seventeenth Day of May, 2016

Michelle K. Lee
*Director of the United States Patent and Trademark Office*